Dec. 20, 1932.                S. G. DOWN                1,891,669
                          FLUID PRESSURE BRAKE
                          Filed Jan. 29, 1932
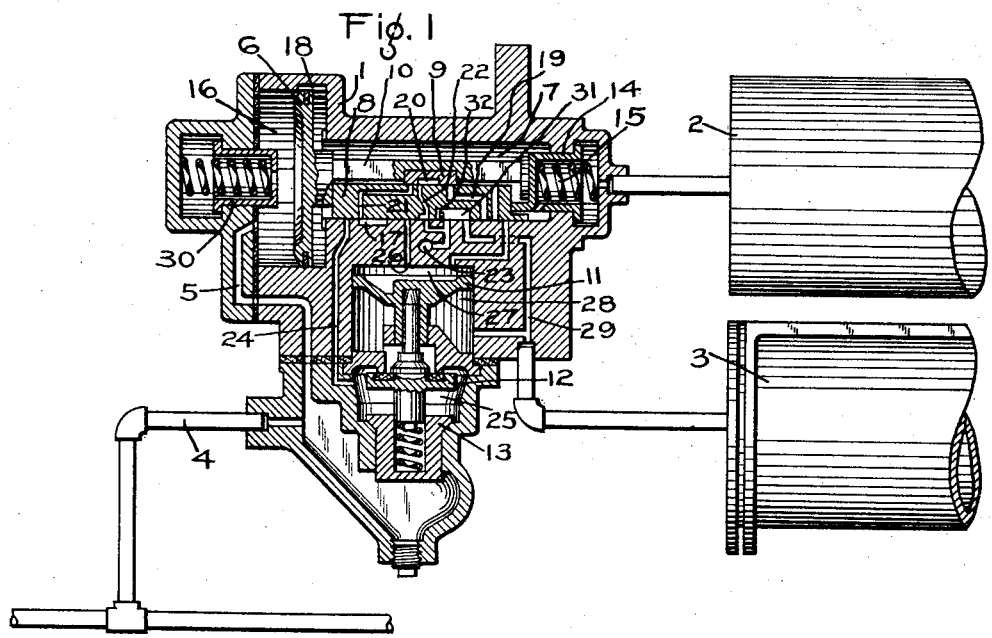
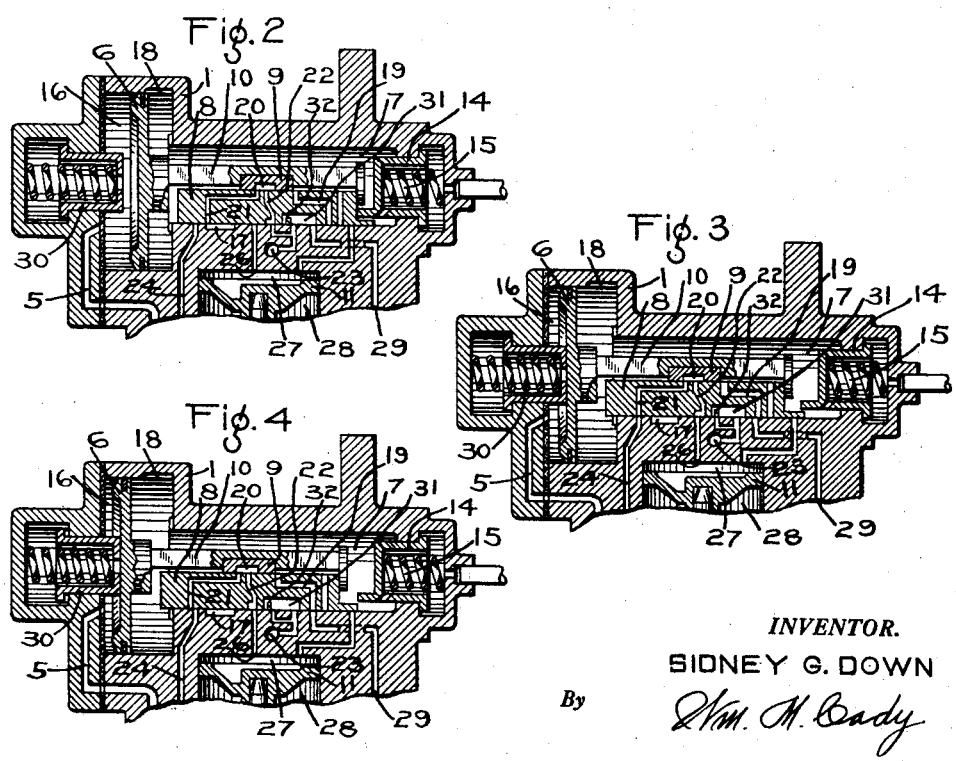
INVENTOR.
SIDNEY G. DOWN
By *Wm. M. Cady*
ATTORNEY.

Patented Dec. 20, 1932

1,891,669

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed January 29, 1932. Serial No. 589,639.

This invention relates to fluid pressure brakes, and more particularly to a triple valve device for an automatic fluid pressure brake system, for controlling the brakes on the cars of a railway train.

The triple valve device commonly employed for controlling the brakes is of the retarded release type, having a normal full release position and an inner restricted release position. On cars at the head end of the train, where the increase in brake pipe pressure, in releasing the brakes, is rapid, the triple valve piston is first moved to the inner restricted release position, and then returns to the full release position upon substantial equalization of fluid pressures on the triple valve piston.

It is sometimes the case that the triple valve piston and the main slide valve are not moved back from the restricted release position to the full release position, and when this occurs, there is danger that the piston will not be moved sufficiently to close the usual feed groove when the brake pipe pressure is reduced to effect a service application of the brakes, with the result that fluid pressure flowing from the auxiliary reservoir through the feed groove will prevent the build up of a sufficient pressure differential to ensure the movement of the triple piston to service application position.

The principal object of my invention is to provide a triple valve device of the retarded release type, having means for ensuring the movement of the triple valve parts to service application position when the brake pipe pressure is reduced to effect an application of the brakes.

According to my invention, the exhaust cavity and other ports and passages of the main slide valve of the triple valve device are reduced in area as much as possible and the seating area of the main slide valve is made as small as practicable, for the purpose of reducing the frictional resistance of the main slide valve to movement, so that the return movement of the triple piston from the inner restricted release position to the full release position will always be assured.

With the triple valve parts made so responsive to a slight moving force, however, the triple valve device will be unstable and will be liable to move to application position under slight variations or fluctuations in brake pipe pressure, when not intended, and I therefore provide means for increasing the resistance of the main slide valve to movement when the piston has moved to close the feed groove. For this purpose, a loading cavity is provided at the seat of the main slide valve, which cavity is connected to the atmosphere through the graduating valve, upon movement of the piston to close the feed groove.

In the accompanying drawing; Fig. 1 is a view of a car brake equipment including a triple valve device of the retarded release type shown in section, and embodying my invention, the parts being shown in full release position; Fig. 2 a fragmentary sectional view of the triple valve device shown in Fig. 1, showing the parts in position with the triple piston just closing the feed groove; Fig. 3 a view similar to Fig. 2, showing the parts in quick service position; and Fig. 4 a view similar to Fig. 2, showing the parts in full service application position.

As shown in Fig. 1, the car fluid pressure brake equipment comprises a triple valve device 1, an auxiliary reservoir 2, a brake cylinder 3, and a brake pipe 4.

The triple valve device 1 comprises a casing having a piston chamber 16, connected to the brake pipe 4 through passage 5 and containing piston 6. The valve chamber 7 at the opposite side of the piston 6 is connected to the auxiliary reservoir 2 and contains a main slide valve 8 and a graduating slide valve 9, adapted to be operated, through a piston stem 10 by piston 6.

The triple valve casing also contains the usual quick action valve device comprising a piston 11 and a vent valve 12 adapted to be operated by piston 11 to vent fluid from the brake pipe, past check valve 13, to the brake cylinder 3.

The triple valve device is of the retarded release type and is therefore provided with a retarded release stop member 14, the inner movement of which is opposed by a spring 15, The member 14 is adapted to oppose inward movement of the piston stem 10 and the main slide valve 8 from full release position to the restricted release position.

According to my invention, the frictional resistance of the main slide valve to movement is reduced to a minimum, by making the seating area of the valve as small as possible, and by reducing the area of the usual exhaust cavity and other passages in the valve. In the seat of the main slide valve is provided a loading cavity 17 which is adapted to be connected to the atmosphere through ports and passages controlled by the graduating slide valve 9, when the piston 6 is moved from release position to the position in which the feed groove is closed.

In operation, when the brake pipe 4 is charged with fluid under pressure in the usual manner, the triple piston 6 is moved to release position, in which the usual feed groove 18 is uncovered, permitting flow of fluid from the piston chamber 16 and the brake pipe to valve chamber 7 and the auxiliary reservoir 2.

When a reduction in brake pipe pressure is made to effect a service application of the brakes, the piston 6 first moves to the position shown in Fig. 2, in which communication through the feed groove 18 is cut off. In this movement, the graduating slide valve 9 is moved relatively to the main valve 8, so that the usual service port 19 in the main slide valve 8 is uncovered and so that cavity 20 in the graduating valve 9 connects ports 21 and 22 in the main slide valve 8, as shown in Fig. 2. Ports 21 and 22 are the usual quick service ports through which fluid under pressure is vented from the brake pipe in effecting a service application of the brakes. According to my invention, these ports are utilized to connect the loading cavity 17 with the atmosphere, in the feed groove closing position shown in Fig. 2, the port 20 communicating with cavity 17 and the port 21 with exhaust port 23. With the loading cavity 17 connected to the atmosphere in the feed groove closing position, the resistance of the main slide valve 8 to movement is increased, so that the main slide valve will not be moved to service application position unless the brake pipe pressure is reduced to a sufficient degree to overcome the added resistance to movement, due to the action of the loading cavity 17.

When the brake pipe pressure is reduced sufficiently to cause the piston 6 to move the main slide valve 8, the ports 21 and 22 are moved out of registry with the cavity 17 and the exhaust port 23 respectively, so that further movement of the main slide valve to service position is not opposed by the added frictional resistance due to the loading cavity 17.

The piston 6 is then shifted to quick service position, as shown in Fig. 3, in which port 21 registers with a passage 24 leading to the check valve chamber 25, while port 22 registers with passage 26, leading to the quick action piston chamber 27.

Fluid under pressure is then vented from the brake pipe to the brake cylinder past the check valve 13 to chamber 25 and thence through passage 24, port 21, cavity 20, port 22 to emergency piston chamber 27. The piston 11 is a loose fit in its cylinder, so that fluid flows around the piston to chamber 28 which is open to the brake cylinder 3.

The usual well known local venting of fluid from the brake pipe to the brake cylinder is thus produced, so as to cause quick serial action throughout the train.

In this position, the service port 19 partially registers with passage 29, so that fluid under pressure is supplied from the valve chamber 7 and the auxiliary reservoir to the brake cylinder, to effect a service application of the brakes.

In full service position, as shown in Fig. 4, the service port 19 is in full registry with passage 29, movement from the quick service position shown in Fig. 3, to the full service position, shown in Fig. 4, being opposed by the usual spring stop 30.

In releasing the brakes, on cars at the head end of the train, where the increase in brake pipe pressure is rapid, the triple valve pistons are moved to the inner release position, in which exhaust cavity 31 registers with brake cylinder passage 29, while restricted port 32, leading from said exhaust cavity, registers with exhaust port 23. Fluid is then released from the brake cylinder at a restricted rate on cars at the head end of the train.

On cars at the rear of the train, the triple valve pistons are moved only to the full release position, in which the exhaust cavity 31 directly connects brake cylinder passage 29 with exhaust port 23, so that fluid is released from the brake cylinder on cars at the rear end of the train at a more rapid rate.

It will now be seen that with my improvement, the moving parts of the triple valve device, particularly the main slide valve, are so constructed as to be more sensitive to movement than heretofore, so that in a retarded release triple valve device, the movement of the parts from the inner restricted release position to the full release position is assured and consequently, when the brake pipe pressure is reduced to effect an application of the brakes, the main slide valve being always positioned in the outer full release position, it is only necessary to effect the movement of the triple piston and graduating valve in order to close the feed groove, and with the feed groove closed, the movement of the parts to service application position, upon a reduction in brake pipe pressure is always assured. In the other hand, the increased sensitiveness of the main slide valve to movement is prevented from permitting an undesired movement of the parts to service position under fluctuations in brake pipe pressure, by reason of the loading cavity 17, which is connected to the atmosphere, through a cavity in the graduating valve, when the piston is moved to close the feed groove, so as to then increase the resistance of the main slide valve to movement.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and auxiliary reservoir, of a triple valve device comprising a casing containing a piston subject to the opposing pressures of the auxiliary reservoir and brake pipe and having a feed groove controlled by said piston through which communication is established from the brake pipe to the auxiliary reservoir, and a main slide valve and a graduating valve operated by said piston upon a reduction in brake pipe pressure to effect an application of the brakes, a loading cavity at the seat of the main slide valve being connected to the atmosphere upon movement of the graduating valve by said piston.

2. In a fluid pressure brake, the combination with a brake pipe and auxiliary reservoir, of a triple valve device comprising a casing containing a piston subject to the opposing pressures of the auxiliary reservoir and brake pipe and having a feed groove controlled by said piston through which communication is established from the brake pipe to the auxiliary reservoir, and a main slide valve and a graduating valve operated by said piston upon a reduction in brake pipe pressure to effect an application of the brakes, movement of the piston to close the feed groove operating the graduating valve to connect a loading cavity at the seat of the main slide valve with the atmosphere.

3. In a fluid pressure brake, the combination with a brake pipe and auxiliary reservoir, of a triple valve device comprising a casing containing a piston subject to the opposing pressures of the auxiliary reservoir and brake pipe and having a feed groove controlled by said piston through which communication is established from the brake pipe to the auxiliary reservoir, and a main slide valve and a graduating valve operated by said piston upon a reduction in brake pipe pressure to effect an application of the brakes, the main valve and the graduating valve controlling ports through which fluid is vented from the brake pipe to effect quick service action, said ports being utilized to connect a loading cavity at the seat of the main slide valve with the atmosphere, upon movement of the graduating valve by said piston relative to the main valve.

4. In a fluid pressure brake, the combination with a brake pipe and auxiliary reservoir, of a triple valve device having a piston subject to the opposing pressures of the brake pipe and auxiliary reservoir, and having a feed groove controlled by said piston for establishing communication from the brake pipe to the auxiliary reservoir, a main slide valve having a maximum sensitiveness to movement, and a graduating valve having a movement relative to the main valve, said valves being operated upon a reduction in brake pipe pressure to effect an application of the brakes, a loading cavity at the seat of the main slide valve being connected to the atmosphere upon movement of the piston to move the graduating valve relative to the main valve to a position in which said feed groove is closed by said piston.

In testimony whereof I have hereunto set my hand, this 26th day of January, 1932.

SIDNEY G. DOWN.